United States Patent

[11] 3,627,423

| [72] | Inventors | Julius Z. Knapp<br>Somerset;<br>Daniel J. Verin, Bloomfield; Emanuel B. Hershberg, West Orange, all of N.J. |
|---|---|---|
| [21] | Appl. No. | 12,342 |
| [22] | Filed | Feb. 17, 1970 |
| [45] | Patented | Dec. 14, 1971 |
| [73] | Assignee | Schering Corporation<br>Bloomfield, N.J. |

[54] METHOD AND APPARATUS FOR DETECTING PARTICULAR MATTER IN SEALED LIQUIDS
10 Claims, 4 Drawing Figs.

[52] U.S. Cl...................................................... 356/103,
250/218, 356/197
[51] Int. Cl....................................................... G01n 21/24
[50] Field of Search............................................ 250/218,
223 B; 356/197, 103, 104, 102

[56] References Cited
UNITED STATES PATENTS
2,531,529  11/1950  Price............................. 356/197

3,498,721  3/1970  Thorndike..................... 356/103

Primary Examiner—Ronald L. Wibert
Assistant Examiner—Orville B. Chew, II
Attorney—Morgan, Finnegan, Durham and Pine ABSTRACT: A method and apparatus for detecting particulate contaminates in a liquid; the method comprising the steps of positioning the container containing the liquid to be inspected in light paths angularly disposed to a viewing axis and forming an illuminated area with a shadow zone at the viewing axis, rotating the container and the liquid therein in the illuminated area and viewing the liquid from the shadow zone; the apparatus comprising a platform for supporting a container to be inspected, means for rotating and stopping the platform, light sources for directing light at the container at an angle relative to a viewing axis to form an illuminated area through the container with a shadow zone at the viewing axis, a camera having an electrooptical transducer, said camera being mounted at said viewing axis, and means connected to the camera for optically viewing the transduced image.

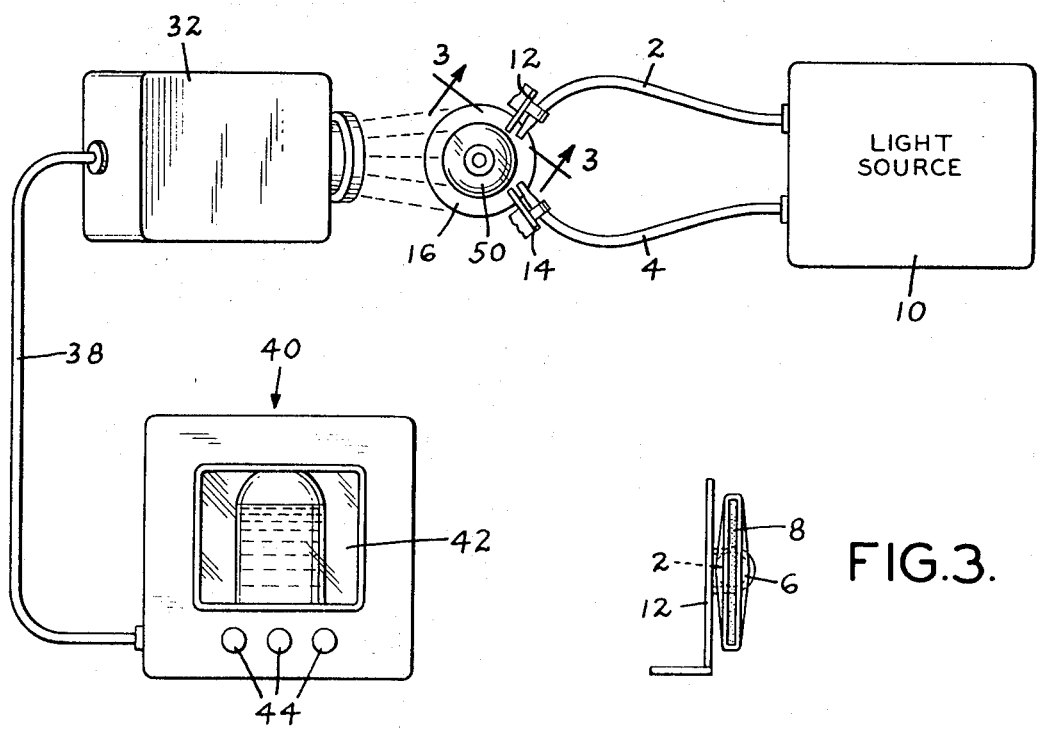
FIG.1.
FIG.3.
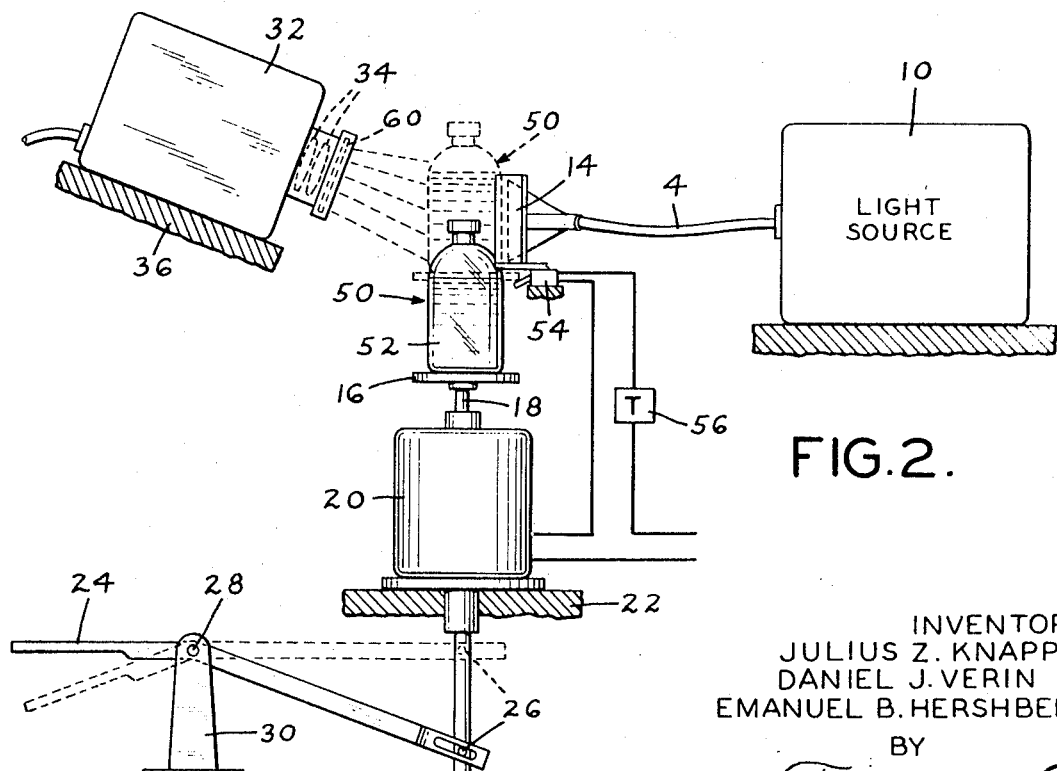
FIG.2.
INVENTORS:
JULIUS Z. KNAPP
DANIEL J. VERIN
EMANUEL B. HERSHBERG
BY
Morgan, Finnegan Durka & Pive
ATTORNEYS

METHOD AND APPARATUS FOR DETECTING PARTICULAR MATTER IN SEALED LIQUIDS

This invention relates to a method and apparatus for inspecting liquids and, more particularly, to a method and apparatus for detecting particulate contaminates in the inspected liquid, especially pharmaceutical solutions for parenteral injection.

Pharmaceutical solutions for parenteral injection are prepared with precautions to prevent particulate contamination. The solution, after it is prepared, is packaged in transparent containers, such as, vials or ampuls, usually glass, which are hermetically sealed. The method and apparatus is especially suited to the inspection of liquid in blow-molded vials.

Despite the precautions taken in preparing and packaging pharmaceutical solutions for parenteral usage, particulate contamination does occur. Since such contaminate particles can be dangerous or even lethal, if injected into the patient, an inspection of each container, after it is filled and sealed, is mandatory.

Various attempts have, heretofore, been made to provide a method and apparatus for inspecting containers to detect the presence of particulate contaminants therein. Such arrangements have included illuminating systems and a variety of detection units for alignment with the illuminating source for detecting the presence of particles in a container positioned between the source and detection unit. Such arrangements have been expensive to produce, difficult to adjust and complicated to use. For the most part, modulation of light passing from the illuminating source to the detection unit by the particle moving between the source and detection unit has been relied upon as an indication of the presence of contaminating particles in the container. Such interruption of light does not indicate particle size. Furthermore, in many such systems, the detection unit and illuminating source have been placed at the opposite sides of the container and in substantial alignment with each other and perpendicular to the movement of the particles in the container when such container and contents are rotated. This alignment makes it difficult, if not impossible, to detect particles floating on the surface of the solution or resting on the bottom of the container. Because of the difficulties and complications of such method and apparatus, a large proportion of the inspection of filled containers in the pharmaceutical industry is carried out by inspectors who visually inspect each container. Such visual inspection is slow, time consuming, costly and subject to human ability, judgement, fatigue and error. Even under the most ideal of inspection conditions, particles that can be seen by the human eye during visual inspection are relatively large.

In the method and apparatus of the instant invention, the container to be inspected is illuminated from light sources angularly disposed relative to each other, the container and the sensing unit. One light source is disposed at one side of the viewing axis of the sensing device and a second light source is disposed on the other side of the viewing axis. The light is distributed axially along the container preferably for the full height of the solution and, preferably, both sources are of equal intensity. Single or multiple optical glass fiber bundles exposed, at one end, to a common light source and arranged in columns at opposite sides of the viewing axis of the sensing device have been found to be especially suited for illumination. Other light sources would also be suitable.

The container to be inspected is positioned between the light sources and the sensing device and the light rays emanating from the sources are not directed toward the sensing device but, rather, are directed at the container so that the light beams intersect in the solution or liquid in the container to illuminate substantially all of the liquid. The inner walls of the container, where the light strikes such walls, reflects the light into the solution so that substantially all of the liquid is illuminated. The angles at which the light sources are directed at the container are adjusted so that the light, passing from the light sources through the liquid and reflected by the inner walls of the container, leave an angular shadow zone radiating outwardly from the container. The sensing device is situated in this angular shadow zone. Preferably, the light sources are shielded and positioned so that the image of the light sources reflected in the glass wall of the container do not appear on the sensing device.

The sensing device may be any type of electro-optical transducer which produces an electrical response proportional to the varying light intensity of the image focused on it. For example, a camera, such as, a vidicon camera, is focused on the container and is connected, by cable, to a receiver having a screen responsive to signal impulses received from the camera for viewing the transduced image optically. The receiver is positioned so that its optical image is accessible to the operator. Preferably, the image projected on the screen is enlarged for the convenience of the operator and for purposed hereinafter more apparent. The camera axis is inclined relative to the vertical axis of the container, in the preferred embodiment of the invention, so that the upper surface and bottom of the container, as well as the solution therebetween, is within the viewing area of the camera.

The container to be inspected is rotated after it is positioned between the light sources and camera and the container is stopped before inspection. This rotation of the container is at sufficient speed and sufficient duration to rotate the liquid in the container and any particles therein but is below the speed that will cause cavitation of the liquid which results in bubbling and entrapment of air therein. Rotation of the liquid and any particles therein causes the image of the particles picked up by the camera, as later described, and transmitted electronically through the connecting cable to the viewing screen, to correspondingly move across the screen. Such movement permits the image of particles in the solution to be distinguished from images caused by flaws in the glass in the walls of the container or by particles, such as dust, that may be on the outside of the vial.

The light rays emanating from the light sources at either side of the viewing axis of the sensing camera strike the surface of the particles moving in the solution and the particles are illuminated. The resulting image is picked up by the sensing camera and transmitted to the viewing screen. Thus, the image of each particle is transmitted to, and viewed by, the operator on the screen. As has been noted, the particle image on the screen may be enlarged. Without such enlargement, the particle image transmitted to the screen may not be detected by the operator. Particle size can then be determined either by variation of resolution limits or by direct measurement of the visual images. In addition to detecting particles in the solution, the method and apparatus of the instant invention may be used for the measurement of particle size.

While the sensitivity of the method and apparatus of the instant invention to particle size is not critical to the sensing of particles in the solution, it does provide a convenient standard for inspection of pharmaceutical solutions for parenteral usage. The exact size of particles above which, if injected into the patient, will impair or cutoff circulation, cause embolisms, or be lethal, is not known. Such size will, to some extent, depend upon the composition of the particle and the tolerance of the patient and is more critical where the injection is intravenous and not intramuscular. The size of particles that can be detected with the method and apparatus of the instant invention, however, are much smaller than can be detected with the human eye. This is especially true where, in the instant apparatus, the particle image is magnified. Because particles can not be completely eliminated from parenteral solutions and, further, because solutions with particles smaller than can be detected with the human eye have, heretofore, been acceptable, the apparatus of the instant invention is provided with means for selectively blocking out the images of particles below a certain size and for transmitting the images of larger particles. This may be accomplished either electronically between the camera and viewing screen or optically between the camera and container. It may also be accomplished by combined electronic and optical means. As will be later described, optical means have been found to be relatively inexpensive and suited to this purpose. Filtering out the images of smaller particles and transmitting the images of larger particles to the screen simplifies the inspection operation by reducing it to a go-no-go determination and eliminates any need for judgement on the part of the operator. The size of particles below which the image will not be transmitted and above which will be transmitted is arbitrarily selected and controlled. For purposes of inspecting parenteral solutions a particle size of ten to fifteen microns, which is well below the size of particles detectable by the unaided human eye, has been found to be acceptable.

The instant invention will be more fully understood from the following description and appended drawings of an illustrative embodiment in which FIG. 1 is a top plan view of the apparatus with the viewing receiver in front elevational view;

FIG. 2 is a side elevational view of the apparatus of FIG. 1, with the viewing receiver omitted; and FIG. 3 is a sectional view taken at 3—3, FIG. 1.

Figure 4:
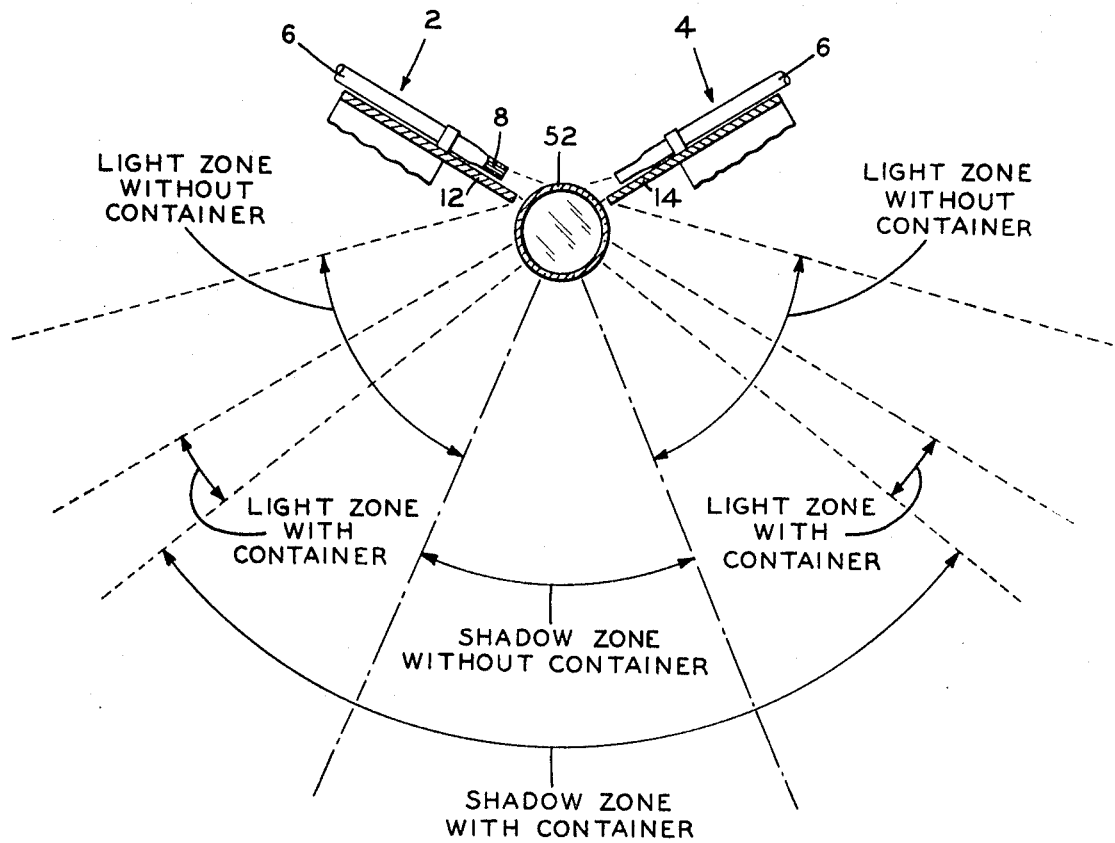
FIG. 4 is an enlarged view showing, schematically, the passage of the light through the container and liquid in the instant invention.

Referring to the drawings, cable 2, 4, each having an outer protective shield 6 and an optical glass fiber bundle 8 within shield 6 are connected, at one of their ends to light source 10. They are mounted, at their opposite ends, in fixed position, behind baffles 12, 14, respectively, above turntable 16. The ends of cables 2, 4, in light source 10 are open and receive light from a light source, not shown, in light source 10 which transmits such light, through glass fiber bundles 8 to the open end of cables 2, 4 at baffles 12, 14. Any light source having an intensity sufficient to illuminate the liquid and particles and compatible with the viewing means may be employed. A 150 Watt 21 Volt, incandescent light, for example General Electric type EKE, has been found suitable.

Turntable 16 is mounted on shaft 18 driven, as hereinafter described, by motor 20 mounted, in fixed position, on support 22. For purposes more apparent hereinafter, shaft 18 driven by motor 20 is movable, vertically, through the motor, by lever 24 pivoted, at 26, to shaft 18 and pivoted, at 28, to fixed support 30.

Electronic camera 32, having a viewing lens 34 is mounted on fixed support 36 so that viewing lens 34 is tilted downwardly to provide a viewing range and angle extending from camera 32 to turntable 16, when the turntable is elevated to the phantom line position in FIG. 2 and upwardly and outwardly between the adjacent ends of baffles 12, 14. Camera 32 is connected, by cable 38, to viewer 40 having a viewing screen 42. Knobs 44, on viewer 40, provide the necessary picture adjustments as are conventional on the preferred type of electro-optical equipment employed, such as an iconoscope.

With turntable 16 lowered to the solid line position, FIG. 2, sealed container 50, containing solution 52 to be inspected for particles, is placed on turntable 16 and the turntable is elevated by depressing lever 24, to the phantom or dotted line position FIG. 2. As container 50 and turntable 16 reach the phantom position, microswitch 54 is closed and, through timer 56, actuates motor 20 for a preset time interval to rotate turntable 16 and container 50 and solution 52 in the container. As hereinabove noted, the speed and time of rotation is sufficient to cause solution 52 and any particles therein to rotate but is below the speed of cavitation, bubbling and entrapment of air in the solution.

Before container 50 is placed on turntable 16 and elevated, light source 10, camera 32 and viewer 40 are turned on. Thus, when the container 50 is elevated, rotated and then stopped, solution 52 is in the path of the light emanating from the ends of fiber bundles 8, in cables 2, 4, angularly toward the viewing axis of lens 34 of camera 32. The sides of any particle in solution 52 are illuminated by the light rays from fiber bundle 8 in cables 2, 4, respectively, and such illumination is detected by camera 32 and transmitted to screen 42 of viewer 40. Lens 34 of camera 32 is adjusted to the desired resolving power by screen 60 or by electro-optical techniques or in combination. The patterned openings of optical screen 60 will, for instance, transmit particle images above a certain size, for example, 10 to 15 microns, but will block the transmission of particle images of smaller sizes. Thus, the operator, seeing a particle or particles imaged on screen 42 can reject the container undergoing inspection and pass those containers where there is no particle imaged on the screen. Where, of course, the operator sees a particle imaged and the particle image is not moving across the screen, he immediately knows that the imaged particle is either on the outside of the container or is a flaw in the glass and the container is not rejected.

In the method and apparatus of the instant invention, the surface of any particles in the solution is illuminated both by direct and reflected light. To provide such side illumination, the light sources are angularly disposed at both sides of the viewing axis of the device and the solution is viewed for contaminating particles from the other side of the container. This phenomena is illustrated in FIG. 4. The beams of light from fiber bundles 8 in cables 2, 4 pass through the wall of container 50 and intersect in solution 52. The width of the beam at bundles 8 in each of the cables 2, 4 is preferably of a width not less than 5 percent and not more than 75 percent of the diameter of the container to be measured when light sources of normal intensity are used. The width may be smaller with light sources of higher intensity, for example, an arc, and wider when the intensity is extremely low. The height of such beams, as they enter the solution, is not less than the height of such solution. After the light beams intersect, the beams strike the inner wall of the container a portion of the light passes through the container wall and a portion is reflected, by the wall into the solution and strike the inner wall at the opposite side. Such reflection of the light beams illuminates the solution in the container. Such light, illuminating the solution, is picked up by the particles, forming the viewable particle image.

The illumination of the solution and the reflection of the light beams by the inner wall of the container are controlled by the angle at which the light beams from fiber bundles 8 in cables 2, 4, direct the light beam at container 50 and solution 52 therein. In the instant invention this angle is adjusted so that, in an angular area, radiating angularly outwardly from container 50 at an angle of about 30°, no light is emitted from container 50 or solution 52. Thus, insofar as light from cables 2, 4 are concerned there is an angular-shaped light-less area, or shadow zone, formed and it is in this shadow zone in which the viewing means is positioned.

As has been noted, for purposes of inspection, screen 60 is of a particular size to block particle images of a size below, 15 example, 10 to 15 microns but to pass images of particles of a larger size. By using screens of different size and by counting the particle images, the method and apparatus of the instant invention may be used for measuring particle size and particle content. Thus, in addition to inspection of liquid for particle content above a predetermined size, which is the primary intended use for the method and apparatus of the instant invention, the method and apparatus are adaptable for laboratory use for particle measurement and count.

The terms and expressions which have been employed are used as terms of description and not of limitation, and there is no intention in the use of such terms and expressions of excluding any equivalents of the features shown and described or portions thereof, but it is recognized that various modifications are possible.

We claim:

1. A method for detecting in relative size particulate matter in a liquid in a transparent container comprising the steps of
   a. projecting at least two light beams through said container so that they intersect within said liquid, illuminate substantially all of said liquid, exit therefrom and delineate an angular shadow zone radiating outwardly from said container;

b. rotating said container about its axis, at a speed below that at which said liquid cavitates, to cause the liquid in said container and any particulate matter therein to move through said light beams and form a moving image of any particulate matter; and c. while said liquid and any particulate matter therein are still moving, viewing said illuminated liquid from a position in said shadow zone and off the path of any of said light beams to detect the presence of moving images of particulate matter therein.

2. A method as recited in claim 1 in which the rotation of said container is stopped prior to said viewing.

3. A method as recited in claim 2 in which said viewing position is also outside of the space defined by the planes of the upper and lower surfaces of said liquid.

4. A method as recited in claim 1 in which, prior to viewing, said images are passed through means to prevent the passage of those particle images having less than a prespecified size.

5. Apparatus for inspecting a liquid in a container for particulate contaminates, said apparatus including means for supporting a container, light means for directing at least two light beams at said container and said liquid along light paths angularly disposed to a viewing axis passing through said container so that said light paths intersect in said container and illuminate substantially all of said liquid and form an angular shadow zone at said viewing axis, means on said supporting means for rotating said container supported thereon and viewing means at said viewing axis for viewing said container on said supporting means.

6. Apparatus as recited in claim 5 in which said light means includes a first light means for directing said light at said container along a first path angularly disposed at one side of said viewing axis and a second light means for directing said light at said container along a second path angularly disposed at the other side of said viewing axis.

7. Apparatus as recited in claim 6 in which said viewing means includes electro-optical means.

8. Apparatus as recited in claim 7 in which said electro-optical means includes a vidicon camera and a receiver connected, by cable, to said camera, said receiver having a screen responsive to signal impulses from said camera for viewing images of particles in said liquid.

9. Apparatus as recited in claim 8 in which said camera is mounted angularly outside of the space defined by the planes of the upper and lower surfaces of the liquid in said container.

10. Apparatus as recited in claim 9 in which said camera includes an optical screen for allowing the transmission of particle images above a certain size and for preventing the transmission of particle images below said certain size.

* * * * *